United States Patent
Janssen (10) Patent No.: US 12,180,426 B2
(45) Date of Patent: Dec. 31, 2024

(54) PROCESS FOR TREATING OFFGAS FROM HYDROTREATING OF RENEWABLE FEEDSTOCKS

(71) Applicant: SHELL OIL COMPANY, Houston, TX (US)

(72) Inventor: Andries Hendrik Janssen, Amsterdam (NL)

(*) Notice: Subject to any disclaimer, the term of this patent is extended or adjusted under 35 U.S.C. 154(b) by 42 days.

(21) Appl. No.: 18/253,946

(22) PCT Filed: Dec. 16, 2021

(86) PCT No.: PCT/EP2021/086042
§ 371 (c)(1),
(2) Date: May 23, 2023

(87) PCT Pub. No.: WO2022/129258
PCT Pub. Date: Jun. 23, 2022

(65) Prior Publication Data
US 2023/0416614 A1 Dec. 28, 2023

(30) Foreign Application Priority Data
Dec. 17, 2020 (EP) .................................. 20214818

(51) Int. Cl.
*C10G 3/00* (2006.01)
*B01D 53/047* (2006.01)
(Continued)

(52) U.S. Cl.
CPC .............. *C10G 3/50* (2013.01); *B01D 53/047* (2013.01); *B01D 53/1437* (2013.01);
(Continued)

(58) Field of Classification Search
CPC .............. C10G 3/50; C10G 2300/4037; C10G 2300/4081; C10G 2300/42;
(Continued)

(56) References Cited

U.S. PATENT DOCUMENTS 6,656,249 B1 * 12/2003 Buisman ................. C01B 17/05
95/205
7,999,143 B2 8/2011 Marker et al.
(Continued)

OTHER PUBLICATIONS

Basu et al. ("Conversion of Hydrogen Sulfide to Elemental Sulfur by Chloroblum thlosulfatophllum in a CSTR with a Sulfur-Settling Separator", Applied Biochemistry and Biotechnology, vol. 45146, 1994, p. 499-508). (Year: 1994).*
(Continued)

*Primary Examiner* — Ali Z Fadhel
(74) *Attorney, Agent, or Firm* — SHELL USA, INC.

(57) ABSTRACT

A method for treating an offgas produced in the processing of a renewable feedstock, includes hydrotreating a renewable feedstock to produce an effluent having a hydrotreated liquid and a vapour phase. The effluent vapour phase contains hydrogen, carbon dioxide, hydrogen sulphide and carbon monoxide. The effluent is separated into a liquid stream and an offgas streams. The offgas stream, containing carbon dioxide and hydrogen sulphide is directed to abiological desulfurization unit where a majority of the hydrogen sulphide is converted to elemental sulphur and a CO2-rich gas stream is produced.

12 Claims, 7 Drawing Sheets

(51) Int. Cl.
- *B01D 53/14* (2006.01)
- *B01D 53/52* (2006.01)
- *B01D 53/84* (2006.01)

(52) U.S. Cl.
CPC ....... *B01D 53/1462* (2013.01); *B01D 53/526* (2013.01); *B01D 53/84* (2013.01); *B01D 2256/22* (2013.01); *B01D 2257/304* (2013.01); *B01D 2257/502* (2013.01); *B01D 2257/504* (2013.01); *C10G 2300/4037* (2013.01); *C10G 2300/4081* (2013.01); *C10G 2300/42* (2013.01); *C10G 2300/703* (2013.01)

(58) Field of Classification Search
CPC ............ C10G 2300/703; B01D 53/047; B01D 53/1437; B01D 53/1462; B01D 53/526; B01D 53/84; B01D 2256/22; B01D 2257/304; B01D 2257/502; B01D 2257/504; B01D 2251/304; B01D 2251/306; B01D 2251/606; B01D 2251/95; B01D 2252/10; B01D 2252/20484; B01D 2252/20489; B01D 2256/16; Y02A 50/20; Y02C 20/40; Y02P 20/151; Y02P 30/20; C10K 1/004; C10K 1/122

See application file for complete search history.

(56) References Cited

U.S. PATENT DOCUMENTS

| | | |
|---|---|---|
| 8,809,610 B2 | 8/2014 | Van Beijnum et al. |
| 8,912,374 B2 | 12/2014 | Van Heuzen et al. |
| 9,902,975 B2 | 2/2018 | Klok et al. |
| 10,543,458 B2 * | 1/2020 | Klok ................. C02F 3/2806 |
| 2009/0077864 A1 | 3/2009 | Marker et al. |

OTHER PUBLICATIONS

International Search Report and Written Opinion Received for PCT Patent Application No. PCT/EP2021/086042, Mailed on Feb. 10, 2022, 9 Pages.

\* cited by examiner

PROCESS FOR TREATING OFFGAS FROM HYDROTREATING OF RENEWABLE FEEDSTOCKS

CROSS REFERENCE TO RELATED APPLICATIONS

This is a National stage application of International Application No. PCT/EP2021/086042, filed 16 Dec. 2021, which claims priority of European Application No. 20214818.5, filed 17 Dec. 2020 which is incorporated herein by reference in its entirety.

FIELD OF THE INVENTION

The present invention relates to the field of producing fuel and/or chemicals from renewable feedstocks and, in particular, to treating offgas generated in that process.

BACKGROUND OF THE INVENTION

The increased demand for energy resulting from worldwide economic growth and development have contributed to an increase in concentration of greenhouse gases in the atmosphere. This has been regarded as one of the most important challenges facing mankind in the 21$^{st}$ century. To mitigate the effects of greenhouse gases, efforts have been made to reduce the global carbon footprint. The capacity of the earth's system to absorb greenhouse gas emissions is already exhausted. Accordingly, there is a target to reach net-zero emissions by 2050. To realize these reductions, the world is transitioning away from solely conventional carbon-based fossil fuel energy carriers. A timely implementation of the energy transition requires multiple approaches in parallel. For example, energy conservation, improvements in energy efficiency and electrification may play a role, but also efforts to use renewable resources for the production of fuels and fuel components and/or chemical feedstocks.

For example, vegetable oils, oils obtained from algae, and animal fats are seen as new sources for fuel production. Also, deconstructed materials are seen as a potential source for renewable fuels materials, such as pyrolyzed recyclable materials or wood.

Renewable materials may comprise materials such as triglycerides with very high molecular mass and high viscosity, which means that using them directly or as a mixture in fuel bases is problematic for modern engines. On the other hand, the hydrocarbon chains that constitute, for example, triglycerides are essentially linear and their length (in terms of number of carbon atoms) are compatible with the hydrocarbons used in/as fuels. Thus, it is attractive to transform triglyceride-comprising feeds in order to obtain good quality fuel components. As well, renewable feedstocks may comprise unsaturated compounds and/or oxygenates that are unsaturated compounds.

The renewable feedstocks are therefore hydrotreated to remove oxygen and, where, the renewable feedstock is coprocessed with petroleum-derived feedstocks, the feed is hydrotreated to remove sulphur as well.

Effluent from the hydrotreating step includes hydrotreated liquid and a gas phase containing hydrogen, carbon dioxide, hydrogen sulphide, carbon monoxide, and light hydrocarbons. The effluent is then separated into liquid and offgas streams by a number of different methods. Both from an economic standpoint and an environmental view, the offgas is preferably recycled to the reaction zone. However, without treatment, the concentration of $CO_2$ and/or carbon monoxide will build-up, thereby reducing the hydrogen partial pressure, negatively impacting the hydrotreating reactions. It is possible to recover hydrogen by conventional separation steps, while $H_2S$, $CO_2$ and/or carbon monoxide are typically recovered together.

Offgas containing $H_2S$ from conventional refineries is most commonly treated in a Claus unit. A Claus unit produces elemental sulphur from gaseous $H_2S$ by first reacting with oxygen to produce sulphur dioxide and water. The sulphur dioxide then reacts with $H_2S$ to produced elemental sulphur and water.

A challenge with using a Claus unit to react with $H_2S$ in an offgas from a hydrotreating reactor used for treating renewable feedstocks is that there is a higher content of $CO_2$ in the offgas as compared to conventional petroleum feedstocks due to the oxygen content of the renewable feedstocks. With excess amounts of $CO_2$, the required temperatures for reaction to occur are not reached and/or excess by-products, for example carbonyl sulphide (COS), are produced. Accordingly, there is a need to find an alternative to Claus units for managing offgas streams from hydrotreating renewable feedstocks.

U.S. Pat. No. 7,999,143B2 (Marker et al.) describes a process for producing diesel fuel from renewable feedstocks with reduced hydrogen consumption. The process involves hydrogenating and deoxygenating a renewable feedstock. Water is added to the deoxygenation reaction to drive carbon monoxide and water to react to form hydrogen and $CO_2$. A gaseous effluent from an isomerization reactor is directed to a system of at least two amine absorbers to separate $CO_2$ carbon dioxide and $H_2S$ from the effluent. Amine in the first amine absorber is regenerated to release $CO_2$ and $H_2S$. The released $CO_2$ and $H_2S$ is passed to the second amine scrubber that contains an amine selective to $H_2S$, but not selective to $CO_2$. $H_2S$ is recycled to the deoxygenation zone.

One challenge of relying on two amine scrubbers in series is that the $H_2S$ released from the second amine scrubber is in a low-pressure gas stream, requiring significant compression. Accordingly, significant compression is required, adding to the operating cost of the process.

There remains a need for a process for treating offgas from hydrotreating of renewable fuels in a cost-effective manner.

SUMMARY OF THE INVENTION

According to one aspect of the present invention, there is provided a method for treating an offgas produced in the processing of a renewable feedstock, comprising the steps of hydrotreating a renewable feedstock to produce an effluent comprising a hydrotreated liquid and a vapour phase comprising hydrogen, carbon dioxide, hydrogen sulphide and carbon monoxide; separating the effluent into one or more liquid streams and one or more offgas streams, wherein at least one of the offgas streams comprises carbon dioxide and hydrogen sulphide; directing the at least one of the one or more offgas streams to a biological desulfurization unit; and converting a majority of the hydrogen sulphide in the biological desulfurization unit to elemental sulphur and producing a CO2-rich gas stream.

BRIEF DESCRIPTION OF THE DRAWINGS

The method of the present invention will be better understood by referring to the following detailed description of preferred embodiments and the drawings referenced therein, in which.

DETAILED DESCRIPTION OF THE INVENTION

The present invention provides a method for treating an offgas produced while hydrotreating a renewable feedstock. An effluent produced while hydrotreating includes a hydrotreated liquid and a gas phase comprising hydrogen, carbon dioxide, hydrogen sulphide, light hydrocarbons and carbon monoxide. The effluent is separated into one or more liquid steams and one or more offgas streams. In accordance with the present invention, at least one of the offgas streams comprising $H_2S$ and $CO_2$ is directed to a biological desulphurization unit. In the biological desulfurization unit, $H_2S$ is converted to elemental sulphur, resulting in a $CO_2$-rich gas stream with decreased $H_2S$ content. The elemental sulphur may be used to produce, for example, without limitation, fungicides, fertilizers, pesticides, medicines, cosmetics, rubber products, sulphiding agent for hydrotreating, and sulphuric acid.

The method of the present invention is important for the energy transition and can improve the environment by producing energy and/or chemicals from renewable sources, and in particular from degradable waste sources. In a preferred embodiment, the $CO_2$-rich gas stream is captured and stored and/or sequestered, thereby lowering the carbon intensity of processes for producing fuel and/or chemicals from renewable sources.

The renewable feedstock includes materials suitable for the production of fuels, fuel components and/or chemical feedstocks. A preferred class of renewable materials are bio-renewable fats and oils comprising triglycerides, diglycerides, monoglycerides, free fatty acids, and/or fatty acid esters derived from bio-renewable fats and oils. Examples of fatty acid esters include, but are not limited to, fatty acid methyl esters, fatty acid ethyl esters. The bio-renewable fats and oils include both edible and non-edible fats and oils. Examples of bio-renewable fats and oils include, without limitation, algal oil, brown grease, canola oil, *Carinata* oil, castor oil, coconut oil, colza oil, corn oil, cottonseed oil, fish oil, hempseed oil, jatropha oil, lard, linseed oil, milk fats, mustard oil, olive oil, palm oil, peanut oil, rapeseed oil, sewage sludge, soy oils, soybean oil, sunflower oil, tall oil, tallow, used cooking oil, yellow grease and combinations thereof.

Another preferred class of renewable materials are liquids derived from biomass and waste liquefaction processes. Examples of such liquefaction processes include, but are not limited to, (hydro)pyrolysis, hydrothermal liquefaction, plastics liquefaction, and combinations thereof. Renewable materials derived from biomass and waste liquefaction processes may be used alone or in combination with bio-renewable fats and oils.

The method of the present invention is particularly advantageous in the processing of renewable feedstocks. However, in one embodiment of the present invention, renewable feedstock may be co-processed with petroleum-derived hydrocarbons. Petroleum-derived hydrocarbons include, without limitation, all fractions from petroleum crude oil, natural gas condensate, tar sands, shale oil, synthetic crude, and combinations thereof. A combined renewable and petroleum-derived feedstock may comprise a renewable feed content in a range of from 1 to 99 wt. %.

Reactions in the hydrotreating step include hydrogenation, hydrodeoxygenation, hydrodenitrogenation, hydrodesulphurization, and combinations thereof. A hydrotreating step may be followed by, with or without separation of the gases, in one or more catalyst beds/zones, in the same or different reactors, hydroisomerization, selective cracking and/or hydrodearomatization.

The hydrotreating catalyst may be any catalyst known in the art that is suitable for hydrotreating, typically a catalyst comprising metals of Group VIII and/or Group VIB. Hydrotreating catalysts are generally more active in a sulphided form as compared to an oxide form of the catalyst. Meanwhile, renewable feedstocks generally have a low sulphur content. Accordingly, a sulphiding agent is added to the feed to maintain the catalyst in a sulphided form.

Preferably, the hydrotreating catalyst comprises sulphided catalytically active metals. Examples of suitable catalytically active metals include, without limitation, sulphided nickel, sulphided cobalt, sulphided molybdenum, sulphided tungsten, sulphided CoMo, sulphided NiMo, sulphided MoW, sulphided NiW, and combinations thereof. A catalyst bed/zone may have a mixture of two types of catalysts and/or successive beds/zones, including stacked beds, and may have the same or different catalysts and/or catalyst blends. In case of such sulphided hydrotreating catalyst, a sulphur source will typically be supplied to the hydrotreating catalyst in order to keep the catalyst in sulphided form during the hydrotreating step.

The hydrogenation components may be used in bulk metal form or the metals may be supported on a carrier. Suitable carriers include refractory oxides, molecular sieves and combinations thereof. Examples of suitable refractory oxides include, without limitation, alumina, amorphous silica-alumina, titania, silica, and combinations thereof.

A hydrotreating catalyst may be sulphided in-situ or ex-situ. In-situ sulphiding may be achieved by supplying a sulphur source, usually $H_2S$ or an $H_2S$ precursor (i.e. a compound that easily decomposes into $H_2S$ such as, for example, dimethyl disulphide, di-tert-nonyl polysulphide or di-tert-butyl polysulphide) to the hydrotreating catalyst during operation of the process. The sulphur source may be supplied with the feed, the hydrogen stream, or separately. An alternative suitable sulphur source is a sulphur-comprising hydrocarbon stream boiling in the diesel or kerosene boiling range that is co-fed with the feedstock. In addition, added sulphur compounds in hydrotreating feed facilitate the control of catalyst stability and reduce hydrogen consumption.

Preferably, $H_2S$ is provided to the hydrotreater in an amount in the range of from 50 to 5,000 ppmv, preferably from 100 to 3,000 ppmv, more preferably from 500 to 2,000 ppmv, or an equivalent amount of an $H_2S$ precursor, based on the volume of hydrogen supplied, is supplied to the hydrotreating step. The amount of $H_2S$ is dependent on a number of factors, including, for example, the gas:oil ratio in the hydrotreating step.

Preferably, the hydrotreating step is conducted in the presence of hydrogen with a catalyst at hydrotreating conditions in the presence of 50-20000 w-ppm, preferably 1000-8000 w-ppm, most preferably 2000-5000 w-ppm of sulphur in the total feed, calculated as elemental sulphur. By "total feed" to the hydrotreater, we mean the total of fresh feed and any optional diluting agent(s).

Operating conditions in the hydrotreating step include pressures in a range of from 1.0 MPa to 20 MPa, temperatures in a range of from 200 to 410° C. and liquid hourly space velocities in a range of from 0.3 $m^3/m^3 \cdot h$ to 5 $m^3/m^3 \cdot h$ based on fresh feed. Preferably, the pressure is selected from 2.0 MPa to 15 MPa. Preferably, the temperature is in the range of from 200 to 400° C., more preferably from 240 to 390° C., most preferably from 260 to 385° C.

In order to control any temperature increase in a catalyst bed/zone, staged supply of feedstock and/or hydrogen may be applied. An alternative way to control the temperature increase over the catalyst bed/zone is to dilute the feedstock, preferably by recycling part of a hydrotreated liquid stream. An alternative way to control the temperature in a catalyst bed/zone is to introduce a hydrotreated liquid stream and/or recycle gas as a quench stream between catalyst beds/zones.

The ratio of hydrogen to feed supplied in the hydrotreating step is in a range of from 200 to 10,000 normal L (at standard conditions of 0° C. and 1 atm (0.101 MPa)) per kg of feed, preferably from 500 to 8,000 NL/kg, more preferably from 800 to 3,000 NL/kg. Reference herein to feed is the total of fresh feedstock excluding diluent.

The hydrotreating step produces an effluent comprising a hydrotreated liquid and a vapour phase comprising hydrogen, $H_2S$, $CO_2$, carbon monoxide and light hydrocarbons.

The effluent is separating into one or more liquid streams and one or more offgas streams. At least one of the offgas streams comprises $CO_2$ and $H_2S$. The concentration of $H_2S$ and $CO_2$ in the offgas stream is dependent on the feedstock and the process conditions selected for a desired product. Preferably, the concentration of $H_2S$ in the offgas stream is in a range from 50 to 5000 ppmv, more preferably in a range from 100 to 3000 ppmv, most preferably from 500 to 2000 ppmv. Preferably, the concentration of $CO_2$ in the offgas stream is in a range from 0.05 to 15 vol. %, more preferably from 0.2 to 10 vol. %, most preferably from 1 to 5 vol. %. The volumetric ratio of $CO_2:H_2S$ in the offgas stream is in a range of from 500:1 to 1:1, preferably in a range from 200:1 to 3:1, more preferably in a range from 100:1 to 5:1, even more preferably in a range from 50:1 to 7:1. The offgas stream comprising $CO_2$ and $H_2S$ is then directed to a biological desulfurization unit, where $H_2S$ is converted into elemental sulphur and a $CO_2$-rich gas stream is produced.

Several embodiments of process units for carrying out the method of the present invention are illustrated in FIGS. 1-7. For ease of discussion, additional equipment and process steps that may be used in a process for producing fuels and/or chemicals from a renewable feedstock are not shown. The additional equipment and/or process steps may include, for example, without limitation, pre-treaters, heaters, chillers, air coolers, heat exchangers, mixing chambers, valves, pumps, compressors, condensers, quench streams, recycle streams, slip streams, purge streams, and the like.

Figure 1:
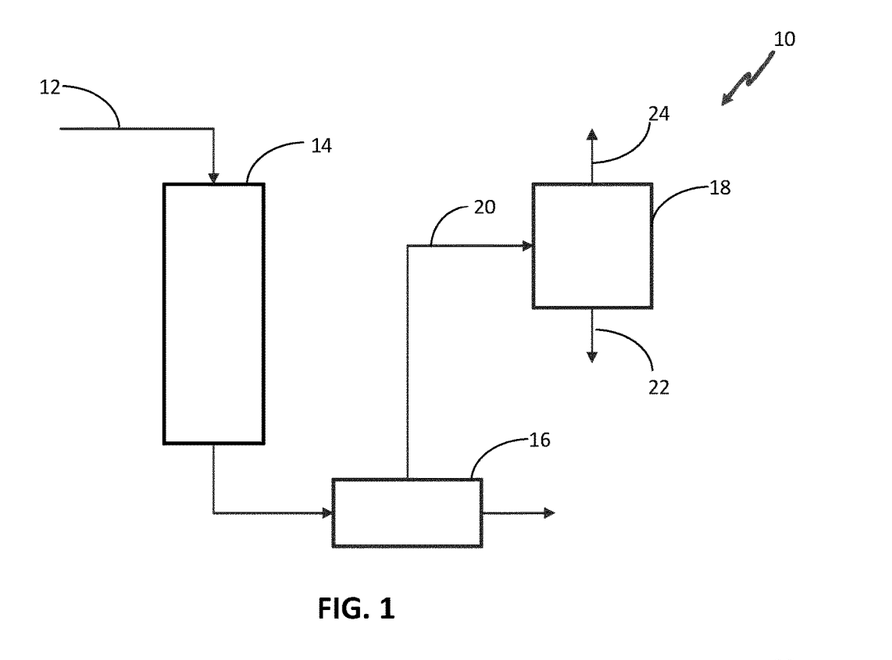
FIG. 1 is a flow diagram illustrating one embodiment of the method of the present invention having a separation unit downstream of the hydrotreating reactor.

In FIG. 1, illustrating a process flow of one embodiment of the present invention, a feed 12 is fed to a hydrotreating reactor 14, with or without pre-treatment. The hydrotreating reactor 14 produces an effluent comprising a hydrotreated liquid and a gas phase comprising hydrogen, $H_2S$, $CO_2$, carbon monoxide and light hydrocarbons. The effluent from the hydrotreating reactor 14 is then directed to one or more separation units 16 to separate the product into one or more liquid streams and one or more offgas streams 20. At least one of the one or more offgas streams 20 is directed to a biological desulfurization unit 18. Other treated gas streams (not shown) may be generated in the process of FIG. 1, including, for example, a hydrogen-enriched stream, a fuel-gas enriched stream, carbon monoxide, and combinations thereof. The biological desulfurization unit 18 converts a majority of the $H_2S$ to elemental sulphur 22 and yields one or more treated gas streams 24. Preferably, at least 90 mol % of the $H_2S$ is converted to elemental sulphur. More preferably, from 90-100 mol % of the $H_2S$ is converted to elemental sulphur. Treated gas streams may include, for example, a $CO_2$ stream, a fuel gas stream, and/or a hydrogen-rich gas stream. The $CO_2$ stream is preferably further processed for storage and/or sequestration. The hydrogen-rich gas stream is preferably recycled to the hydrotreating reactor 14 and/or a stripper. Depending on the pressure of the hydrogen-rich gas stream, for example due to the type of separation unit 16, the stream may be compressed to a higher pressure before recycle. In another embodiment, a methane-containing stream is directed to a hydrogen manufacturing unit.

The one or more separation units 16 include, for example, without limitation, gas/liquid separators, including hot high- and low-pressure separators, intermediate high- and low-pressure separators, cold high- and low-pressure separators, strippers, integrated strippers and combinations thereof. Integrated strippers include strippers that are integrated with hot high- and low-pressure separators, intermediate high- and low-pressure separators, cold high- and low-pressure separators. It will be understood by those skilled in the art that high-pressure separators operate at a pressure that is close to the hydrotreating reactor 14 pressure, suitably 0-10 bar (0-1 MPa) below the reactor outlet pressure, while a low-pressure separator is operated at a pressure that is lower than the hydrotreating reactor 14 pressure or high-pressure separator, suitably 0-15 barg (0-1.5 MPaG). Similarly, it will be understood by those skilled in the art that hot means that the hot-separator is operated at a temperature that is close to the hydrotreating reactor 14 temperature, suitably sufficiently above water dew point (e.g., >20° C., preferably >10° C., above the water dew point) and sufficiently greater than salt deposition temperatures (e.g., >20° C., preferably >10° C., above the salt deposition temperature), while intermediate- and cold-separators are at a reduced temperature relative to the hydrotreating reactor 14. For example, a cold-separator is suitably at a temperature that can be achieved via an air cooler. An intermediate temperature will be understood to mean any temperature between the temperature of a hot- or cold-separator.

In addition, the one or more separation units 16 may include, for example, without limitation, an amine scrubber, a pressure swing adsorption unit, a caustic wash, and combinations thereof.

Figure 2:
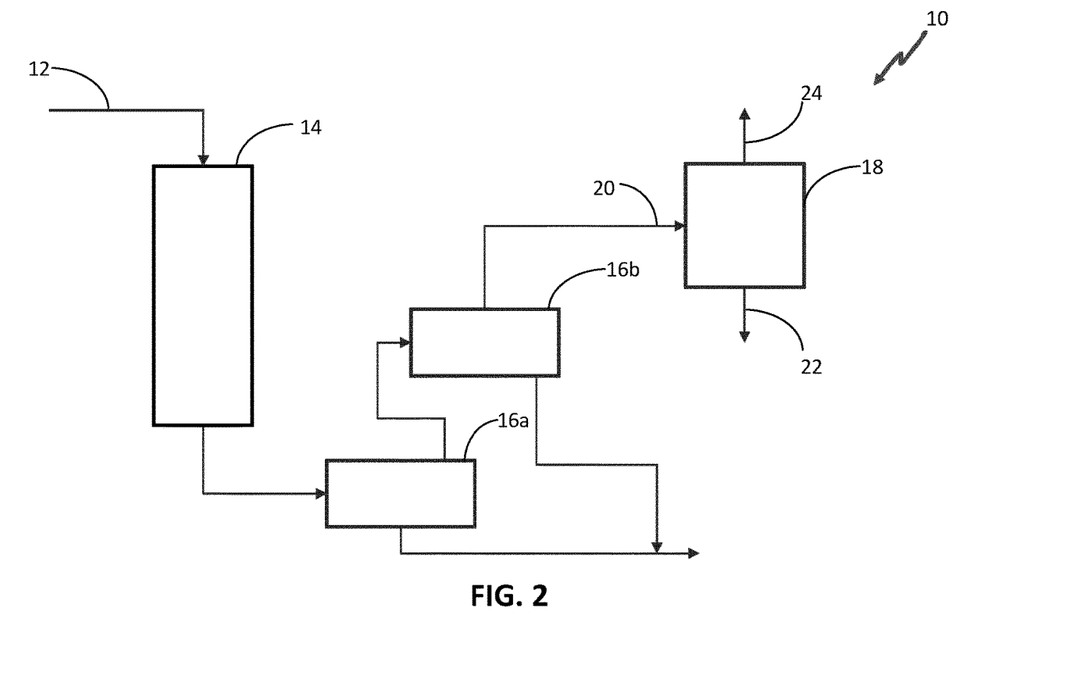
FIG. 2 is a flow diagram illustrating another embodiment of the method of the present invention having a hot separator and a cold separator downstream of the hydrotreating reactor.

In the embodiment shown in FIG. 2, the one or more separation units 16 include a hot separator (HS) 16a, such as a hot high-pressure separator, a hot low-pressure separator, and/or an integrated stripper separator, and a cold separator (CS) 16b, such as a cold high-pressure separator and/or a cold low-pressure separator. The HS 16a flashes off hydrogen-rich gases, in addition to light hydrocarbons, $CO_2$, carbon monoxide and $H_2S$, resulting in a liquid effluent. The HS 16a offgas is then cooled, for example in an air cooler (not shown) or a heat exchanger (not shown), and directed to the CS 16b, where at least a portion of the light hydrocarbons are separated from the offgas stream as a liquid effluent stream. The offgas stream 20 is directed to the biological desulfurization unit 18. The concentration of $H_2S$ and $CO_2$ in the offgas stream 20 after separating steps in the HS 16a and CS 16b is dependent on the feedstock and the process conditions selected for a desired product.

A portion of the liquid effluent from the HS 16a and/or the CS 16b may be recycled and/or used as a diluent and/or a quench stream between catalyst beds in the hydrotreating reactor 14. By recycling from the HS 16a, the operating costs from pumping and/or heating can be reduced.

In one embodiment, the liquid effluent from the HS 16a and/or the CS 16b is fractionated into two or more product streams. In another embodiment, the liquid effluent is further processed, for example by hydroisomerization, hydrocracking, selective cracking, hydrodearomatization, and combinations thereof. In a preferred embodiment, offgas from these further processing reactors/zones may be combined with the offgas stream 20 from the one or more separation units 16.

Figure 3:
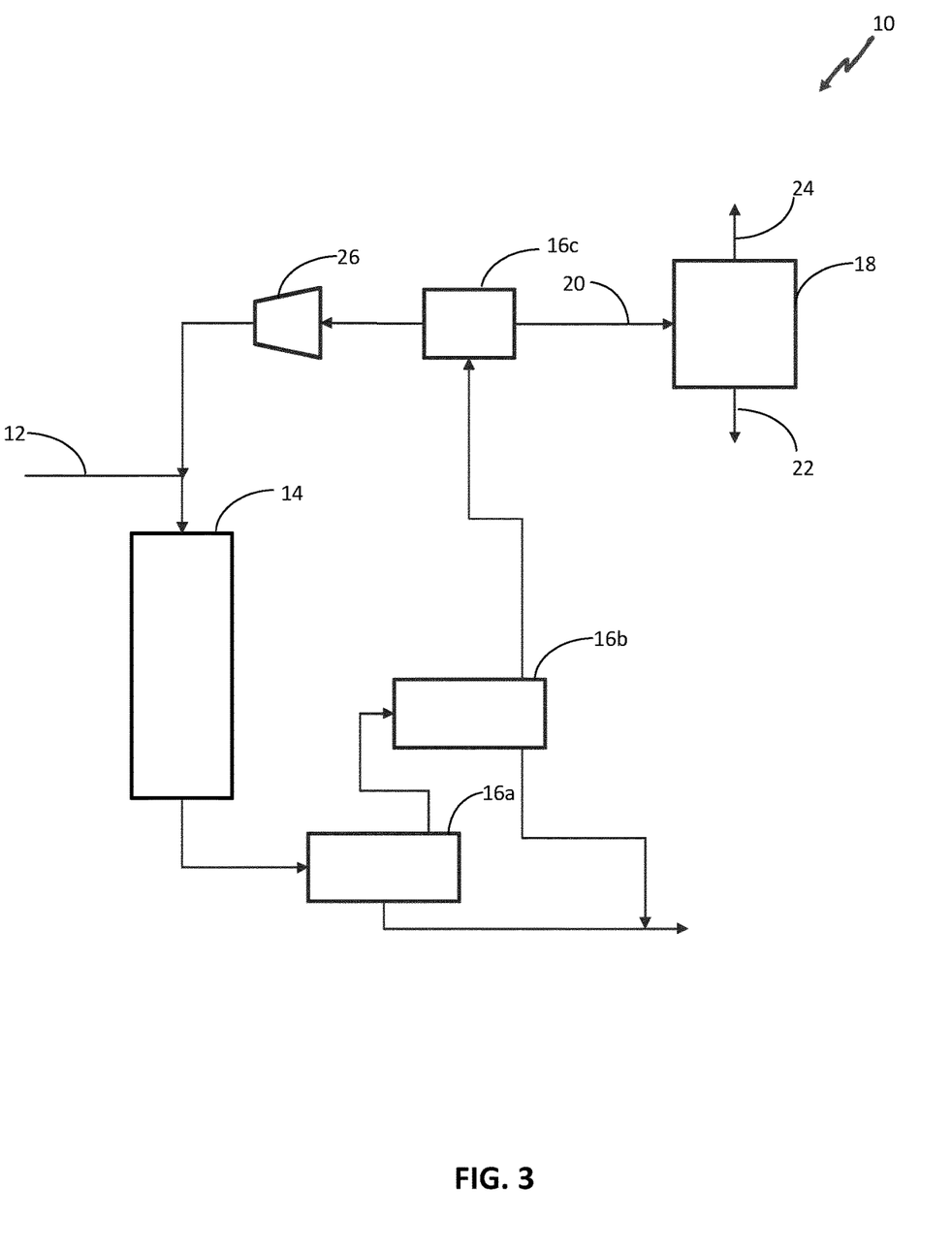
FIG. 3 is a flow diagram illustrating a further embodiment of the method of the present invention having a hot separator, a cold separator and a PSA unit downstream of the hydrotreating reactor.

In the embodiment illustrated in FIG. 3, the one or more separation units 16 include a HS 16a, a CS 16b, and a pressure swing adsorption (PSA) unit 16c. The offgas stream from the CS 16b is directed to the PSA unit 16c to separate a hydrogen-enriched stream from an offgas stream 20 containing $CO_2$ and $H_2S$. The hydrogen-enriched stream is preferably compressed in compressor 26 to recycle a hydrogen-rich stream to the hydrotreating reactor 14, a stripper and/or another processing unit. The offgas stream 20 from the PSA unit 16c is directed to the biological desulfurization unit 18. The offgas stream 20 may also include a portion of the offgas from the HS 16a and/or CS 16b.

Figure 4:
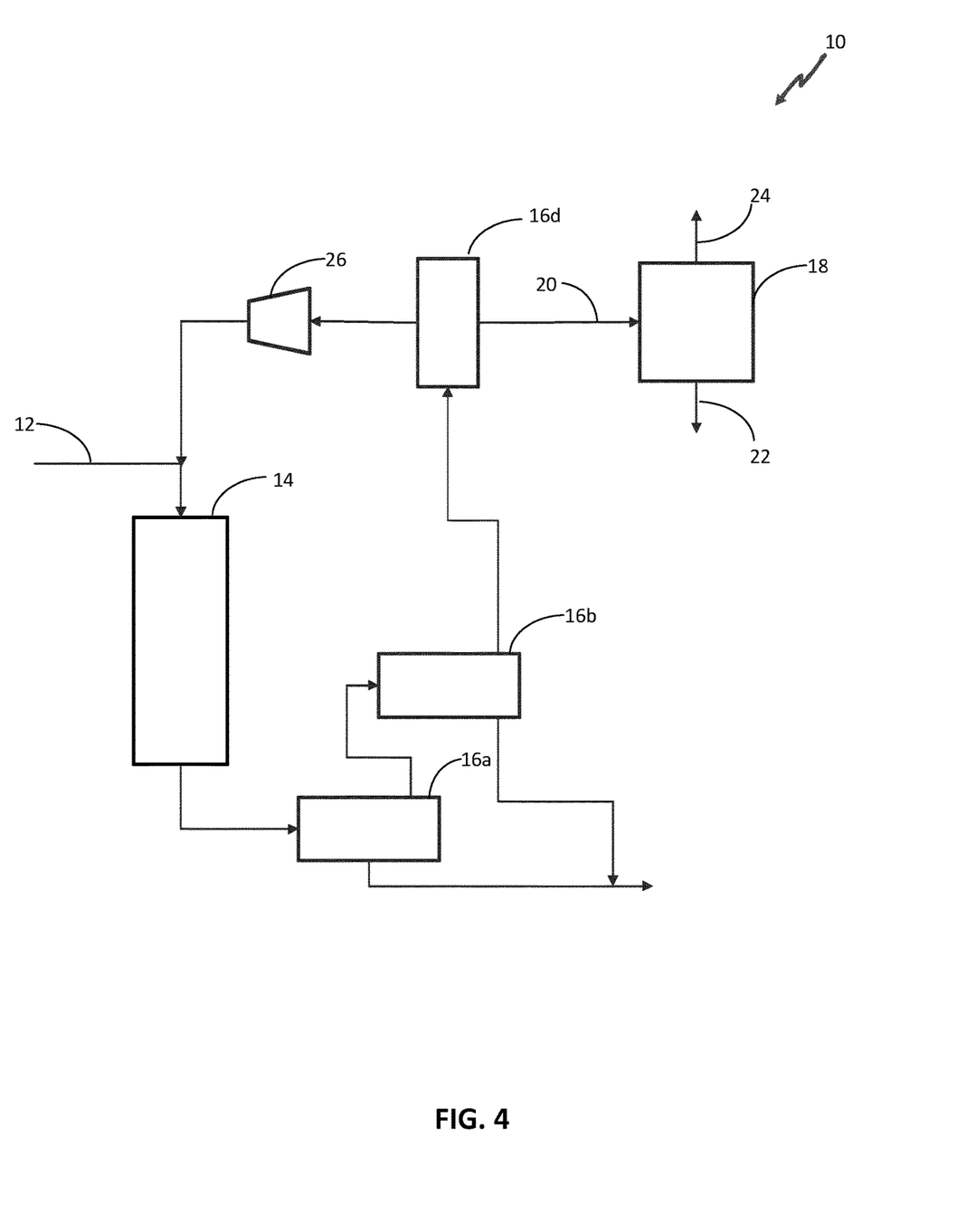
FIG. 4 is a flow diagram illustrating yet another embodiment of the method of the present invention having a hot separator, a cold separator and an amine scrubber downstream of the hydrotreating reactor.

In the embodiment illustrated in FIG. 4, the one or more separation units 16 include a HS 16a, a CS 16b, and an amine scrubber 16d. The offgas stream from the CS 16b is directed to the amine scrubber 16d to separate a hydrogen-enriched stream from an offgas stream 20 containing $CO_2$ and $H_2S$. The hydrogen-enriched stream is preferably compressed in compressor 26 to recycle hydrogen to the hydrotreating reactor 14 and/or another processing unit. The amine scrubber 16d may be a scrubber containing monoethanolamine (MEA), diethanolamine (DEA), methyldiethanolamine (MDEA), promoted MEA, DEA, and/or MDEA, activated MEA, DEA and/or MDEA, and combinations thereof for removal of carbon monoxide. The offgas stream 20 from the amine scrubber 16d is directed to the biological desulfurization unit 18. The offgas stream 20 may also include a portion of the offgas from the HS 16a and/or CS 16b.

Figure 5:
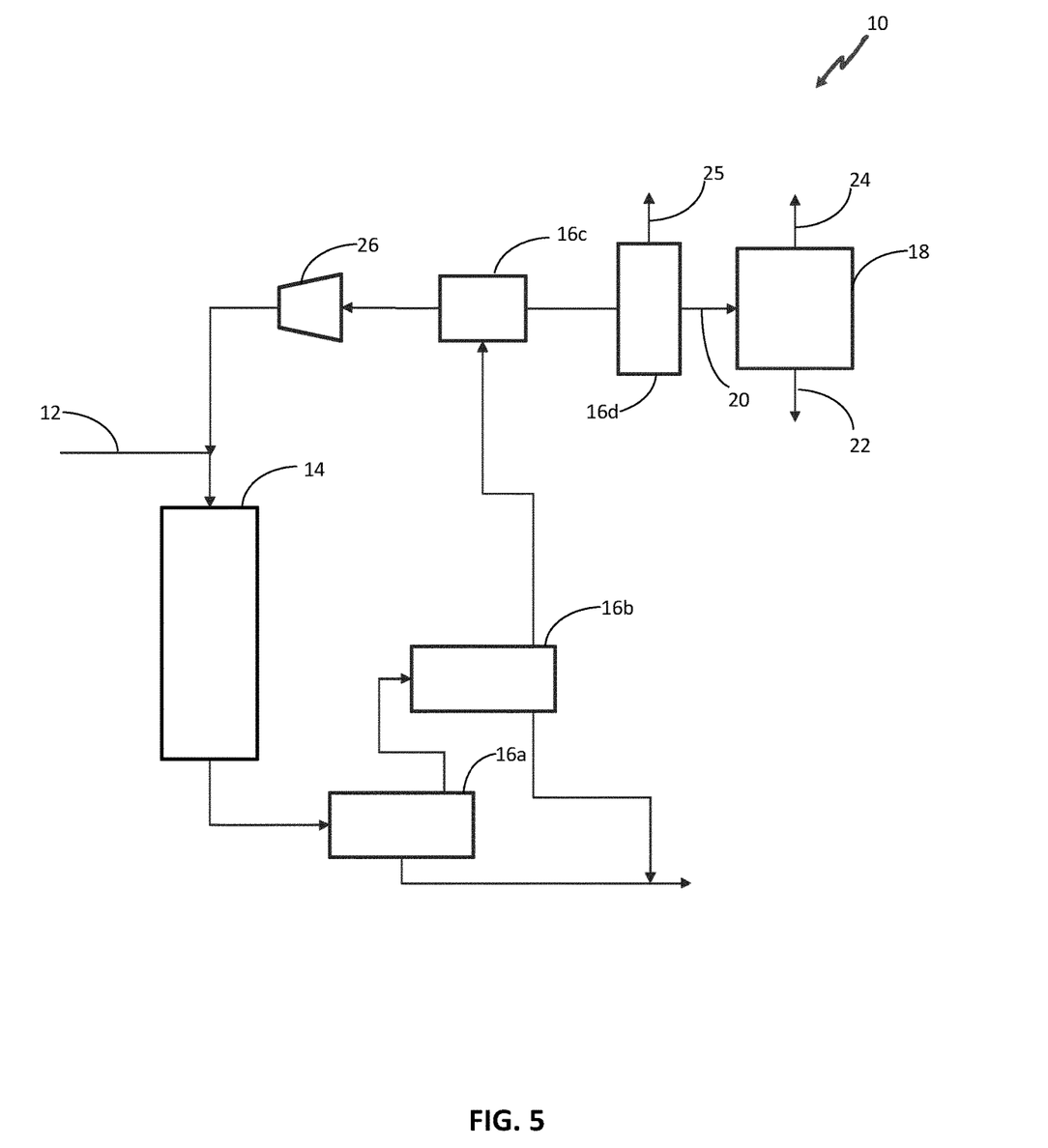
FIG. 5 is a flow diagram illustrating still another embodiment of the method of the present invention having a hot separator, a cold separator, a PSA unit and an amine scrubber downstream of the hydrotreating reactor.

In the embodiment illustrated in FIG. 5, the one or more separation units 16 include a HS 16a, a CS 16b, a PSA unit 16c and an amine scrubber 16d. The offgas stream from the CS 16b is directed to the PSA unit 16c to separate a hydrogen-enriched stream from an offgas stream containing $CO_2$ and $H_2S$. The hydrogen-enriched stream is preferably compressed in compressor 26 to recycle hydrogen to the hydrotreating reactor 14 and/or another processing unit. The offgas from the PSA unit 16c is then directed to the amine scrubber 16d to separate a scrubbed gas 25 that is depleted in $CO_2$ and $H_2S$, resulting in an offgas stream 20 that is enriched in $CO_2$ and $H_2S$. The offgas stream 20 from the amine scrubber 16d is directed to the biological desulfurization unit 18. The offgas stream 20 may also include a portion of the offgas from the HS 16a, CS 16b and/or the PSA unit 16c. The scrubbed gas 25 may contain hydrogen, carbon monoxide and methane, for example.

Figure 6:
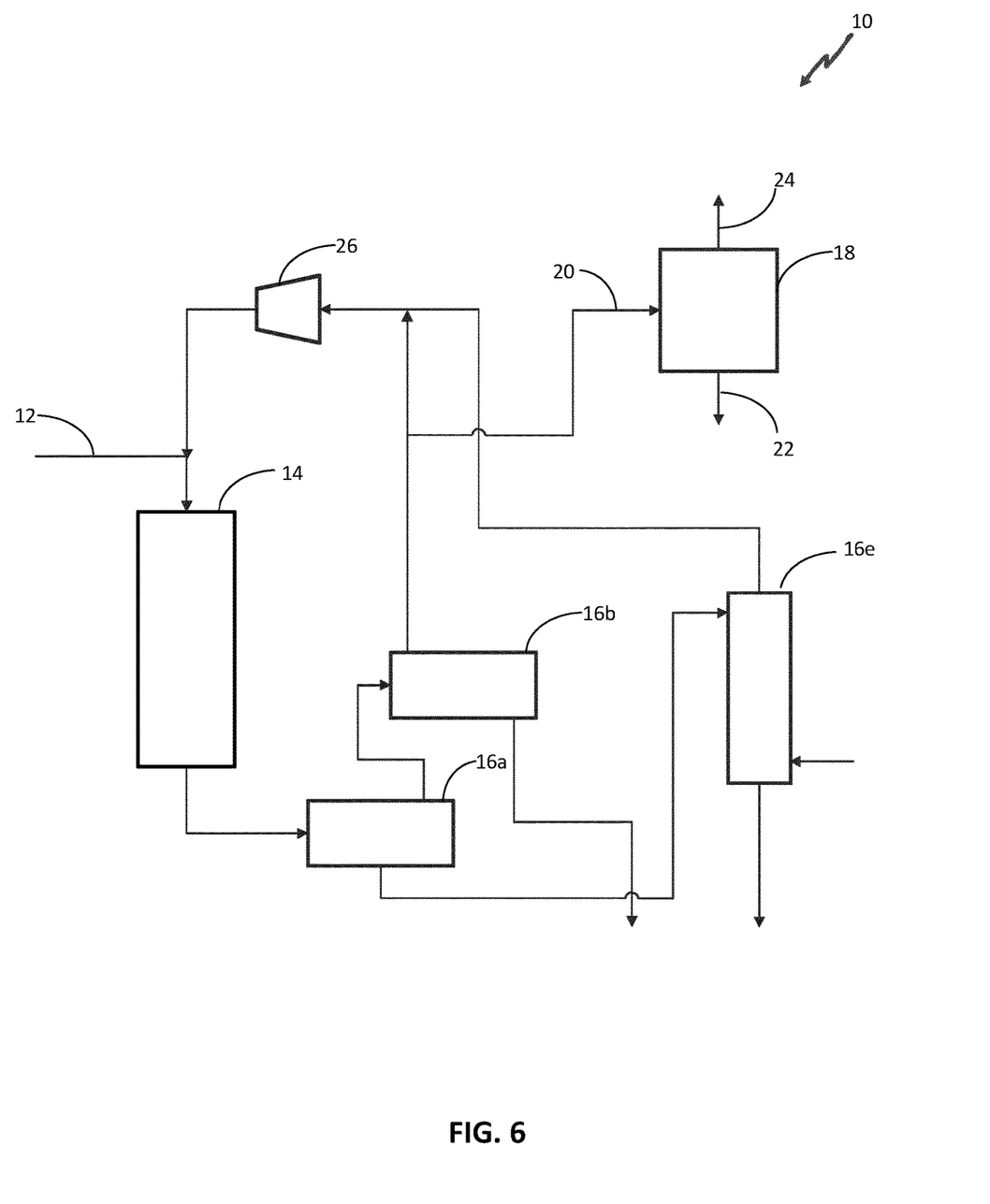
FIG. 6 is a flow diagram illustrating still a further embodiment of the method of the present invention having a hot separator, a cold separator, and a stripper downstream of the hydrotreating reactor.

In the embodiment illustrated in FIG. 6, the one or more separation units 16 include a HS 16a, a CS 16b, and a stripper 16e. The liquid effluent from the HS 16a is directed, in whole or in part, to the stripper 16e, where a pure hydrogen or hydrogen-enriched stream is used to separate any remaining entrained and/or dissolved gas in the hydrotreated liquid effluent. The liquid effluent from the stripper 16e and the CS 16b, together or separately, may be further processed as described previously. At least a portion of the offgas from the CS 16b is directed in offgas stream 20 to the biological desulfurization unit 18. The offgas from the stripper 16e may be compressed in compressor 26 to recycle hydrogen to the hydrotreating reactor 14 and/or another processing unit. Alternatively, or in addition, the offgas stream 20 may also include a portion of the offgas from the HS 16a and/or stripper 16e.

Figure 7:
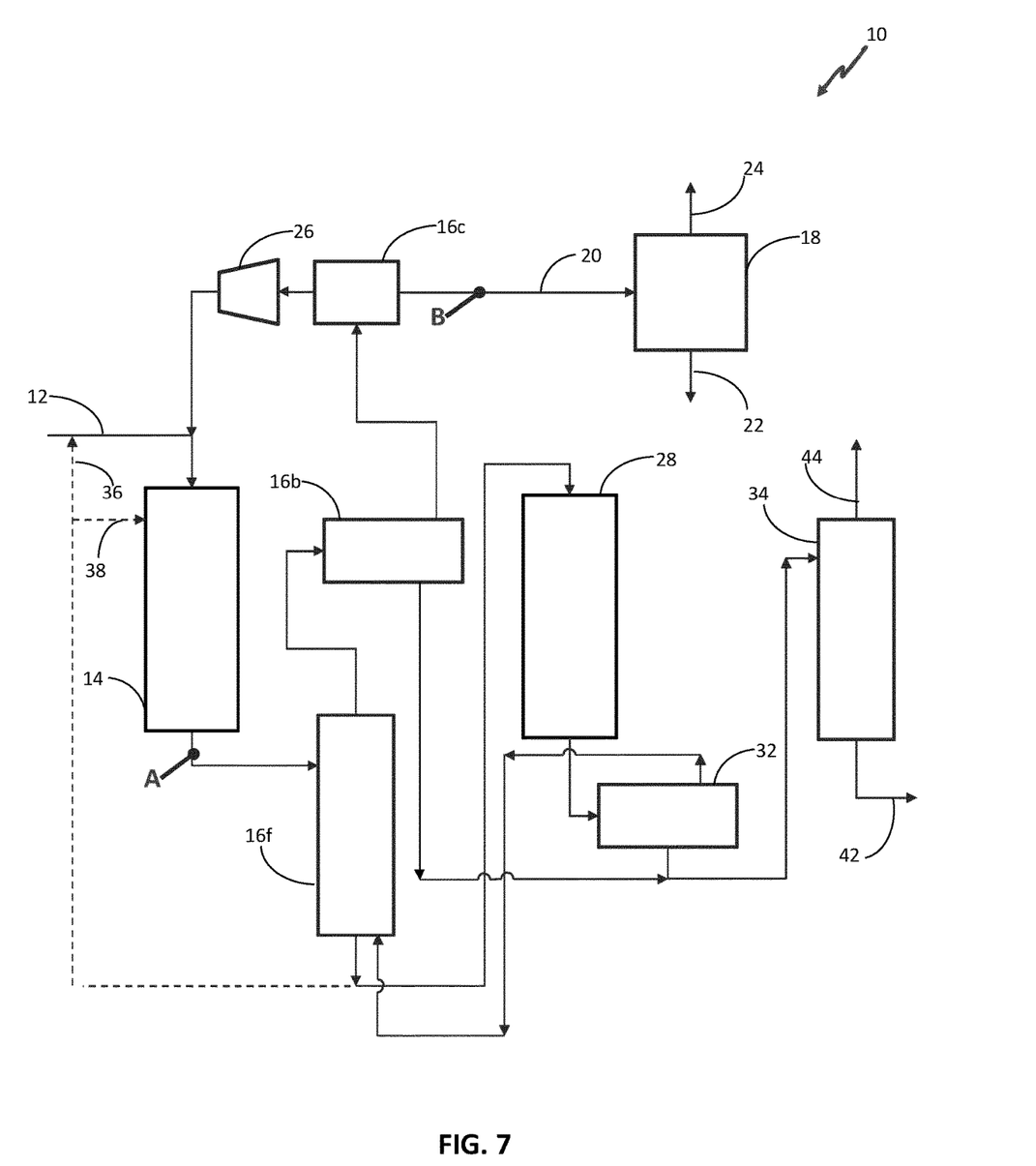
FIG. 7 is a flow diagram illustrating yet a further embodiment of the method of the present invention having an integrated stripper and hot separator, a cold separator and a PSA unit, as well as illustrating one embodiment of further processing.

FIG. 7 illustrates an embodiment showing integration of the hydrotreating reactor 14 with a hydroisomerization reactor 28. As illustrated in FIG. 7, the one or more separation units 16 include an integrated stripper and hot high-pressure separator (HHPS) 16f, a CS 16b, and a PSA unit 16c. It will be understood, however, other combinations of separation units 16, as described and/or illustrated herein, can be used in an integration of the method of the present invention with a hydroisomerization reactor 28 or other further processing unit.

In the embodiment of FIG. 7, the effluent from the hydrotreating reactor 14 is directed to the integrated stripper and HHPS 16f, where at least a portion of the gaseous components in the liquid effluent are separated and/or stripped from the liquid phase. The liquid from the integrated stripper and HHPS 16f is fed to the hydroisomerization reactor 28.

FIG. 7 also illustrates two optional embodiments (dashed lines). In one optional embodiment, a portion of the hydrotreated liquid is recycled in recycle stream 36 to the feed 12. The volumetric ratio of recycled hydrotreated liquid 36 to fresh feed 12 is preferably in a range of from 1:1 to 30:1. In another optional embodiment, a portion of the hydrotreated liquid is provided as one or more quench streams 38 to the hydrotreating reactor 14. The quench stream 38 is used to control temperature in the hydrotreating reactor 14 and therefore typically cooled using, for example, an air cooler (not shown) or a heat exchanger (not shown). One or more quench streams 38 may be added between catalyst beds/zones in the hydrotreating reactor 14.

Paraffinic hydrocarbons in the hydrotreated liquid are isomerized in the hydroisomerization reactor 28 using a suitable isomerization catalyst including, without limitation, Group VIII metals, especially platinum and/or palladium, supported on a refractory oxide and/or a molecular sieve.

As illustrated in FIG. 7, the effluent from the hydroisomerization reactor 28 is passed to a separator 32, for example a HIPS, to separate an isomerized liquid product from an offgas stream. In a preferred embodiment, the isomerization offgas stream is used as the stripping gas in the integrated stripper and HHPS 16f. In another embodiment, the stripping gas for the integrated stripper and HHPS 16f is provided, in whole or in part, from a fresh hydrogen stream, hydrogen from an integrated steam reformer or gasification plant, recycled from the PSA unit 16b, and combinations thereof. Alternatively, or in addition, the isomerization offgas stream may be added to the stream from the PSA unit 16c to compressor 26, preferably with an intervening CHPS (not shown).

The isomerized liquid product from the separator 32 is fed to a product stripper 34 to strip an offgas stream 44 from the isomerized liquid product 42. The stripped isomerized liquid product 42 may then be further processed, for example to fractionate (not shown) into products having different boiling point ranges, including, diesel, naphtha, and jet fuels.

The offgas stream from the CS 16b is directed to the PSA unit 16c to separate a hydrogen-enriched stream from an offgas stream 20 containing $CO_2$ and $H_2S$. The hydrogen-enriched stream is preferably compressed in compressor 26 to recycle hydrogen to the hydrotreating reactor 14 and/or another processing unit.

In the embodiments of FIGS. 1-7, the feed 12 is illustrated as being fed to the top of the hydrotreating reactor 14. However, the feed 12 may be divided and fed to the hydrotreating reactor 14 at two or more inputs to the hydrotreating reactor 14 at the top and/or at multiple points (not shown), for example, between catalyst beds, along the length of the hydrotreating reactor 14. As well, a recycle stream (not shown) from a separation unit downstream of the hydrotreating reactor 14 may be added to the feed 12 in any of the embodiments.

The hydrotreating reactor 14 may include one or more catalyst beds or one or more reactor vessels, each of the vessels containing one or more catalyst beds (not shown). The catalyst beds may be the same or different. The hydrotreating reactor 14 may also include one or more guard beds (not shown) for capturing and/or reacting with contaminants in the feed 12. The hydrotreating reactor 14 may also include one or more catalyst beds for hydroisomerization, selective cracking and/or hydrodearomatization.

At least a portion of one or more offgas streams 20 from the one or more separation units 16 illustrated in FIGS. 1-7 is then directed to the biological desulfurization unit 18.

Figure 8:
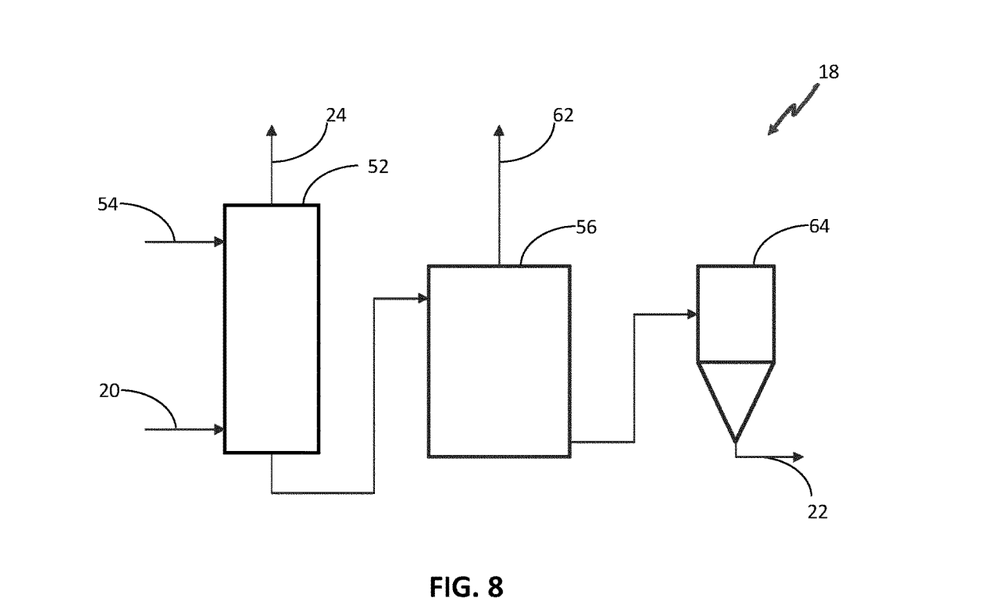
FIGS. 8 and 9 are flow diagrams illustrating two embodiments of a biological desulfurization unit used in the method of the present invention.

FIG. 8 illustrates an embodiment of the biological desulfurization unit 18. One or more of the offgas streams 20 is fed to an absorption column 52. Preferably, the liquid sorbent 54 is fed to the absorption column 52 in a counter-current flow relative to the offgas stream 20.

The liquid sorbent 54 is preferably a liquid alkaline sorbent capable of absorbing $H_2S$ and $CO_2$. More preferably, the liquid sorbent 54 is selected from sodium carbonate, sodium bicarbonate, potassium carbonate, potassium bicarbonate and combinations thereof. A hydrogen-containing offgas stream 24, depleted in $H_2S$ and $CO_2$ is obtained from the adsorption column 52. In one or more embodiments, the hydrogen is compressed and recycled to the hydrotreating reactor 14, stripper 16e, integrated stripper and HHPS 16f, and/or the hydroisomerization reactor 28. In other embodiments, the hydrogen-containing offgas stream is directed to a reforming unit.

An aqueous liquid sorbent 54, loaded with $H_2S$ and $CO_2$, is directed to one or more bioreactors 56. Microorganisms in the bioreactor 56 convert sulphides into elemental sulphur. Microorganisms are preferably sulphur-oxidizing microorganisms. Suitable microorganisms include, without limitation, sulphide-oxidizing bacteria selected from *Halothiobacillus*, *Thioalkalimicrobium*, *Thioalkalispira*, *Thioalkalibacter*, *Thioalkalivibrio*, and related bacteria.

The bioreactor 56 may be operated in an anaerobic mode, an aerobic mode or a combination thereof. Nutrients (not shown) may be added to the bioreactor 56. The microorganisms may be provided in suspension, immobilized on a suitable support, provided as a sludge blanket or film, and combinations thereof.

Figure 9:
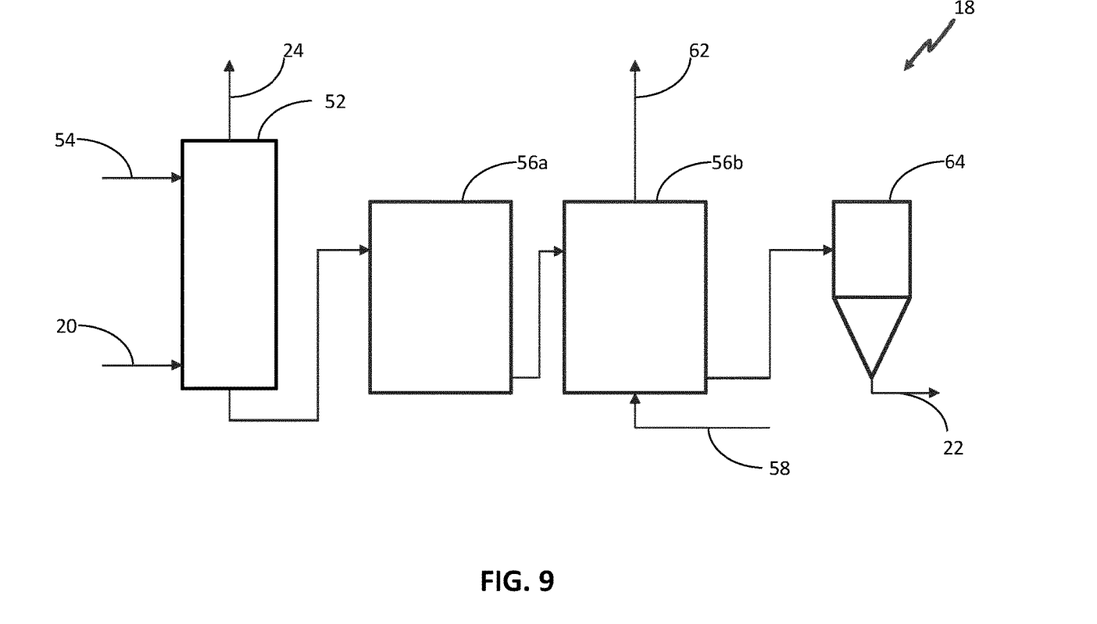

FIG. 9 illustrates an embodiment of the biological desulfurization unit 18 having an anaerobic bioreactor 56a and an aerobic bioreactor 56b. In an anaerobic mode of operation, $H_2S$ is selectively converted to elemental sulphur with little to no production of sulphates. In the embodiment of FIG. 9, microorganisms from the anaerobic bioreactor 56a are regenerated in the aerobic bioreactor 56b. An oxygen-containing stream 58, for example air, is sparged into the aerobic bioreactor 56b.

In the embodiments of FIGS. 8 and 9, a liquid product stream from the bioreactor 56, 56b is passed to a separator 64 to separate precipitated solid elemental sulphur 22. The separator 64 may be a settling tank, a decanter, a centrifuge, a filter press and combinations thereof.

The biological desulfurization unit 18 converts a majority of the $H_2S$ provided to the unit 18 to elemental sulphur. Preferably, at least 90 mol % of the $H_2S$ is converted to elemental sulphur. More preferably, from 90-100 mol % of the $H_2S$ is converted to elemental sulphur. Preferably, less than 5 mol % of the $H_2S$ is converted to other sulphur compounds such as sulphates and thiosulfates.

The biological desulfurizing unit may be a THIOPAQ® O&G unit, available from Paqell B. V. (Amsterdam, NL). Examples of suitable desulfurizing units are described, for example, in U.S. Pat. No. 10,543,458B2 (Klok et al.) and U.S. Pat. No. 9,902,975B2 (Klok et al.).

EXAMPLES

The following non-limiting examples of embodiments of the method of the present invention as claimed herein are provided for illustrative purposes only.

A hydrotreating step was conducted in a pilot plant using a palm oil feedstock. Based on the data collected in the pilot plant test, simulations of $H_2S$ and $CO_2$ content were determined for other feedstocks and products at two points of the process illustrated in FIG. 7.

Simulations were prepared for the feedstocks and products listed in Table I. A summer diesel has a cloud point of −5° C.

TABLE I

| Case | Feedstock | Product |
| --- | --- | --- |
| 1 | 100% Soybean | Summer Diesel |
| 2 | 100% Tallow | Summer Diesel |

The simulations provided expected concentrations of $H_2S$ and $CO_2$ at points A and B of FIG. 7 for each of the feedstock/product combinations listed in Table I. Point A represents a hydrotreated product at the outlet of the hydrotreating reactor 14. Values in Table 2 are provided for the total effluent and the vapour phase of the effluent. Point B represents the offgas stream 20 from the PSA unit 16c. The results are shown in Table II.

TABLE II

| Process Point | | Case 1 (mol %) | Case 5 (mol %) |
|---|---|---|---|
| A (total) | $H_2S$ | 0.15 | 0.15 |
| | $CO_2$ | 1.88 | 2.51 |
| A (vapour phase) | $H_2S$ | 0.18 | 0.17 |
| | $CO_2$ | 2.44 | 2.97 |
| B | $H_2S$ | 0.98 | 0.94 |
| | $CO_2$ | 12.42 | 15.50 |

The simulation results show the relatively higher concentrations of $CO_2$ compared to $H_2S$ that would create a challenge for conventional gas treating by Claus reaction. The simulation results also confirm that treating the offgas stream in a biological desulfurization unit will provide improved gas treatment, as well providing environmental impact and economic advantages over conventional solutions.

While the embodiments are described with reference to various implementations and exploitations, it will be understood that these embodiments are illustrative and that the scope of the inventive subject matter is not limited to them. Many variations, modifications, additions and improvements are possible.

I claim:

1. A method for treating an offgas produced in the processing of a renewable feedstock, comprising the steps of:
hydrotreating a renewable feedstock to produce an effluent comprising a hydrotreated liquid and a vapour phase comprising hydrogen, carbon dioxide, hydrogen sulphide and carbon monoxide;
separating the effluent into one or more liquid streams and one or more offgas streams, wherein at least one of the offgas streams comprises carbon dioxide and hydrogen sulphide;
directing the at least one of the one or more offgas streams to a biological desulfurization unit; and
converting a majority of the hydrogen sulphide in the biological desulfurization unit to elemental sulphur and producing a $CO_2$-rich gas stream.

2. The method of claim 1, wherein the separating step comprises directing the effluent to one or more separator units, the separator unit selected from the group consisting of a hot high-pressure separator, a hot low-pressure separator, an intermediate high-pressure separator, an intermediate low-pressure separator, a cold high-pressure separator, a cold low-pressure separator, a stripper, an integrator stripper, and combinations thereof, and optionally an amine separator, a pressure swing adsorption unit, a caustic wash, and combinations thereof.

3. The method of claim 1, wherein the hydrotreating step further comprises the step of sulphiding a hydrotreating catalyst used for hydrotreating the renewable feedstock.

4. The method of claim 1, wherein the hydrotreating catalyst comprises a catalytically active amount of a metal selected from the group consisting of Group VIII, Group VIB and combinations thereof.

5. The method of claim 3, wherein the sulphiding step comprises adding a gaseous stream of hydrogen sulphide, providing a hydrogen sulphide precursor, and combinations thereof.

6. The method of claim 1, wherein the offgas stream has a concentration of hydrogen sulphide in a range of from 50 to 5,000 ppmv, preferably in a range of from 100 to 3,000 ppmv, more preferably in a range of from 500 to 2,000 ppmv.

7. The method of claim 1, wherein the offgas stream has a concentration of carbon dioxide in a range of from 0.05 to 15 vol. %, preferably in a range of from 0.2 to 10 vol. %, most preferably in a range of from 1 to 5 vol. %.

8. The method of claim 1, wherein a volumetric ratio of carbon dioxide to hydrogen sulphide in the offgas stream is in a range of from 500:1 to 1:1, preferably in a range of from 200:1 to 3:1, more preferably in a range of from 100:1 to 5:1, even more preferably in a range of from 50:1 to 7:1.

9. The method of claim 2, wherein hydrogen is separated from the one or more offgas streams in the pressure swing adsorption unit prior to the converting step, optionally further comprising the step of recycling the hydrogen to the hydrotreating step.

10. The method of claim 1, wherein at least 90 mol % of the hydrogen sulphide is converted to elemental sulphur, preferably from 90 to 100 mol % of the hydrogen sulphide is converted to elemental sulphur.

11. The method of claim 1, wherein the biological desulfurization unit comprises an absorption column, a bioreactor and a separator.

12. The method of claim 1, wherein the CO2-rich stream is provided to a carbon storage and/or sequestration process.

* * * * *

UNITED STATES PATENT AND TRADEMARK OFFICE
CERTIFICATE OF CORRECTION

PATENT NO. : 12,180,426 B2
APPLICATION NO. : 18/253946
DATED : December 31, 2024
INVENTOR(S) : Andries Hendrik Janssen Page 1 of 1

It is certified that error appears in the above-identified patent and that said Letters Patent is hereby corrected as shown below:

On the Title Page

Item (72), in Column 1 (Inventor), Line 2, below "(NL)" insert -- (73) Assignee: Shell USA, Inc., Houston, TX (US) --, as a new field entry.

Item (56), in Column 2, under "Other Publications", Line 2, delete "Chloroblum thlosulfatophllum" and insert -- Chlorobium thiosulfatophilum --.

Item (57), in Column 2, in "Abstract", Lines 8-9, delete "abiological" and insert -- a biological --.

In the Specification

In Column 2, Line 49, delete "of" and insert -- of: --.

In Column 6, Line 60, delete ">20°" and insert -- ≥20° --.

In Column 6, Line 61, delete ">10°" and insert -- ≥10° --.

In Column 6, Line 62, delete ">20°" and insert -- ≥20° --.

In Column 6, Line 63, delete ">10°" and insert -- ≥10° --.

In Column 9, Line 5, delete "HIPS," and insert -- HHPS, --.

Signed and Sealed this
First Day of April, 2025

Coke Morgan Stewart
*Acting Director of the United States Patent and Trademark Office*